(12) United States Patent
Takeuchi et al.

(10) Patent No.: US 10,315,583 B2
(45) Date of Patent: Jun. 11, 2019

(54) VEHICLE SEAT

(71) Applicant: TS TECH CO., LTD., Asaka-shi, Saitama (JP)

(72) Inventors: Taiki Takeuchi, Reynoldsburg, OH (US); Jeremy Ruff, Reynoldsburg, OH (US)

(73) Assignee: TS TECH CO., LTD., Saitama (JP)

( * ) Notice: Subject to any disclaimer, the term of this patent is extended or adjusted under 35 U.S.C. 154(b) by 59 days.

(21) Appl. No.: 15/270,891

(22) Filed: Sep. 20, 2016

(65) Prior Publication Data

US 2017/0282809 A1  Oct. 5, 2017

Related U.S. Application Data

(60) Provisional application No. 62/316,023, filed on Mar. 31, 2016.

(51) Int. Cl.
*B60N 2/30* (2006.01)
*B60R 7/04* (2006.01)
*B60N 2/68* (2006.01)
*B60N 2/60* (2006.01)
*B60N 2/42* (2006.01)

(52) U.S. Cl.
CPC ............ *B60R 7/043* (2013.01); *B60N 2/3047* (2013.01); *B60N 2/4263* (2013.01); *B60N 2/6009* (2013.01); *B60N 2/68* (2013.01); *B60N 2/682* (2013.01)

(58) Field of Classification Search
CPC ........ B60N 2/3047; B60N 3/02; B60N 3/101; B60R 7/043
See application file for complete search history.

(56) References Cited

U.S. PATENT DOCUMENTS

| | | | | |
|---|---|---|---|---|
| 4,720,028 A * | 1/1988 | Takemura | .................. | B60R 7/10 224/313 |
| 6,161,896 A * | 12/2000 | Johnson | .................. | B60R 7/043 297/188.08 |
| 6,959,954 B2 * | 11/2005 | Brandt | ...................... | B60R 7/10 224/313 |
| 7,597,372 B2 * | 10/2009 | Nagamoto | ............. | B62D 43/06 296/37.1 |
| 7,837,248 B2 * | 11/2010 | Nedelman | ................. | B60R 7/10 224/313 |
| 8,550,417 B2 * | 10/2013 | Lee | ........................... | B60R 7/10 248/304 |
| 9,731,657 B1 * | 8/2017 | Salter | ........................ | B60R 7/10 |
| 2008/0272630 A1 * | 11/2008 | Sturt | ........................ | B60N 2/64 297/188.07 |
| 2009/0072595 A1 * | 3/2009 | Tsuda | ................... | B60N 2/3047 297/188.1 |
| 2009/0084922 A1 * | 4/2009 | Martin | .................... | B60R 7/043 248/339 |

(Continued)

FOREIGN PATENT DOCUMENTS

JP  2003212021  7/2003

*Primary Examiner* — Timothy J Brindley
(74) *Attorney, Agent, or Firm* — Hamre, Schumann, Mueller & Larson, P.C.

(57) ABSTRACT

A vehicle seat includes a seat frame, a cover member configured to cover the seat frame and having a through-hole, and a baggage holder configured to allow baggage to be hung, hooked or fixed thereon. The baggage holder is passed from outside to inside of the cover member through the through-hole and fixed to the seat frame.

18 Claims, 8 Drawing Sheets

(56) References Cited

U.S. PATENT DOCUMENTS

| | | | | |
|---|---|---|---|---|
| 2010/0308619 A1* | 12/2010 | Hoge | B60N 2/12 | 296/65.08 |
| 2012/0119479 A1* | 5/2012 | Parker | B60N 2/2809 | 280/807 |
| 2012/0235451 A1* | 9/2012 | Hrdlicka | B60R 7/043 | 297/188.2 |
| 2012/0298678 A1* | 11/2012 | Hanson | B60N 3/103 | 220/694 |
| 2013/0313869 A1* | 11/2013 | Aguirre | B60R 7/043 | 297/188.09 |
| 2014/0042781 A1* | 2/2014 | Reeves | B60N 3/004 | 297/163 |
| 2015/0084360 A1* | 3/2015 | Mueller | B60R 5/006 | 296/37.5 |
| 2015/0122159 A1* | 5/2015 | Valcic | B60N 3/004 | 108/26 |
| 2015/0298615 A1* | 10/2015 | Pywell | B60R 7/043 | 297/188.04 |
| 2016/0052425 A1* | 2/2016 | Akutsu | B60N 2/3013 | 297/341 |
| 2016/0121766 A1* | 5/2016 | Yokoyama | B60R 7/043 | 297/188.14 |
| 2016/0123529 A1* | 5/2016 | Ogawa | F16M 13/022 | 248/222.52 |
| 2016/0193949 A1* | 7/2016 | Pywell | B60R 7/043 | 297/188.1 |
| 2016/0272121 A1* | 9/2016 | Nuako | B60R 7/043 | |
| 2016/0288723 A1* | 10/2016 | Woodhouse | B60R 7/043 | |
| 2016/0332580 A1* | 11/2016 | Nouri | B60R 7/043 | |
| 2017/0253147 A1* | 9/2017 | Fukutani | B60N 2/07 | |
| 2017/0313257 A1* | 11/2017 | Kang | B60R 7/04 | |

* cited by examiner

// VEHICLE SEAT

CROSS REFERENCE TO RELATED APPLICATIONS

This application claims the benefit to U.S. provisional Application No. 62/316,023, filed on Mar. 31, 2016, which is herein incorporated by reference.

TECHNICAL FIELD

An aspect of this disclosure relates to a vehicle seat comprising a baggage holder configured to allow baggage to be hung, hooked or fixed thereon.

BACKGROUND ART

A vehicle seat such as a seat of an automobile may be provided with a baggage holder (e.g., a hook), so that baggage or small articles can be hung, hooked or fixed on the baggage holder. For example, a vehicle seat disclosed in JP2003-212021A includes a seat cushion supported rotatably around its rear end portion and configured to be tipped up, and the baggage holder is fixed to a board that is disposed on the reverse side of the seat cushion.

However, the baggage holder fixed to the board is unstable, and if heavy baggage is hung on the baggage holder, the board may be damaged.

In view of the above, it is desirable to provide a vehicle seat in which a baggage holder is firmly fixed to the vehicle seat.

Further, it is desirable to provide a vehicle seat in which baggage is less likely to come off the baggage holder.

SUMMARY

According to an aspect of the present invention, there is provided a vehicle seat which comprises: a seat frame; a cover member configured to cover the seat frame and having a through-hole; and a baggage holder configured to allow baggage to be hung, hooked or fixed thereon. In this vehicle seat, the baggage holder is passed from outside to inside of the cover member through the through-hole and fixed to the seat frame.

With this configuration of the vehicle seat, the baggage holder is not fixed to the cover member that may be configured to correspond to the board of the conventional vehicle seat. Instead, the baggage holder is passed from outside to inside of the cover member through the through-hole and fixed to the seat frame, so that the baggage holder can be firmly fixed to the vehicle seat.

In an embodiment, the baggage holder may be fixed to the seat frame by a fastening member that has a shank portion piercing through the cover member. In this embodiment, the baggage holder may comprise a first rotation-restricting portion provided around the shank portion as viewed from an axial direction of the fastening member, and the seat frame may comprise a first engagement portion engageable with the first rotation-restricting portion.

Preferably, but not necessarily, the baggage holder may comprise a second rotation-restricting portion provided around the shank portion as viewed from the axial direction of the fastening member, and the cover member may comprise a second engagement portion engageable with the second rotation-restricting portion.

Preferably, but not necessarily, the baggage holder may comprise a third rotation-restricting portion provided around the shank portion as viewed from the axial direction of the fastening member. Further, the cover member may comprise a third engagement portion engageable with the third rotation-restricting portion. As viewed from the axial direction of the fastening member, the first rotation-restricting portion may be located in an area that is defined by a first line perpendicular to a first direction connecting the second rotation-restricting portion and the third rotation-restricting portion and passing through the second rotation-restricting portion and a second line perpendicular to the first direction and passing through the third rotation-restricting portion.

Preferably, but not necessarily, the baggage holder may have a dent portion, and a part of the fastening member may be received in the dent portion.

In an embodiment, the cover member may have a recessed portion at an outer surface thereof, and a part of the baggage holder may be received in the recessed portion.

In an embodiment, the seat frame may have a protruding portion configured to protrude toward the cover member, and the baggage holder may be fixed to the protruding portion.

In an embodiment, the baggage holder may be provided on a lower surface of a seat cushion. In this embodiment, the seat cushion may be configured to be movable between a seating position in which an occupant is allowed to sit on the seat cushion and a tipped-up position in which the seat cushion is tipped up from the seating position. The vehicle seat may further comprise a leg member provided on the seat cushion and configured to contact a floor of a vehicle to support the seat cushion in the seating position. The leg member may be supported rotatably relative to the seat cushion and foldable toward the seat cushion in the tipped-up position. Further, the baggage holder may be disposed at a position other than a position of the leg member located when the seat cushion is in the tipped-up position.

Preferably, but not necessarily, the baggage holder may comprise a first portion extending away from the seat cushion, a second portion extending from a distal end portion of the first portion along the seat cushion, and a third portion extending from a distal end portion of the second portion toward the seat cushion.

These and other aspects will become apparent from the following description taken in conjunction with the accompanying drawings.

DETAILED DESCRIPTION

A detailed description will be given of an illustrative disclosure of the invention with reference to the accompanying drawings.

Figure 1A:
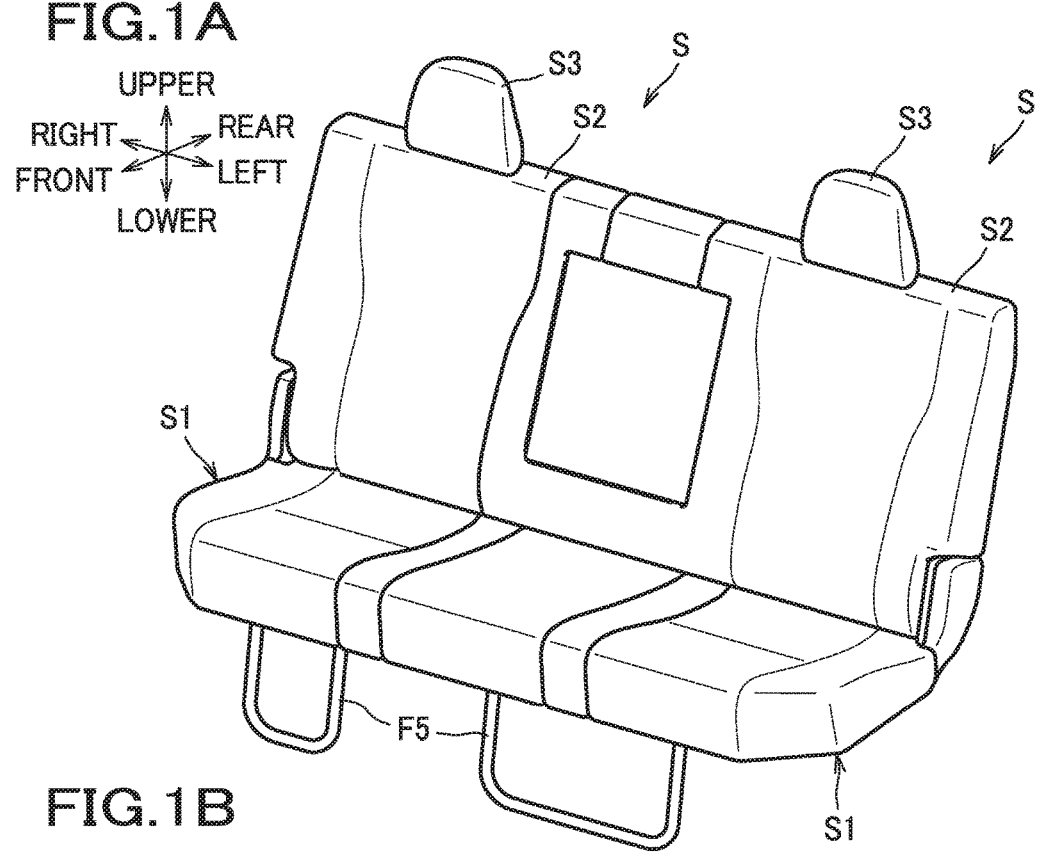
FIG. 1A is a perspective view of a car seat in a seating position.
Figure 1B:
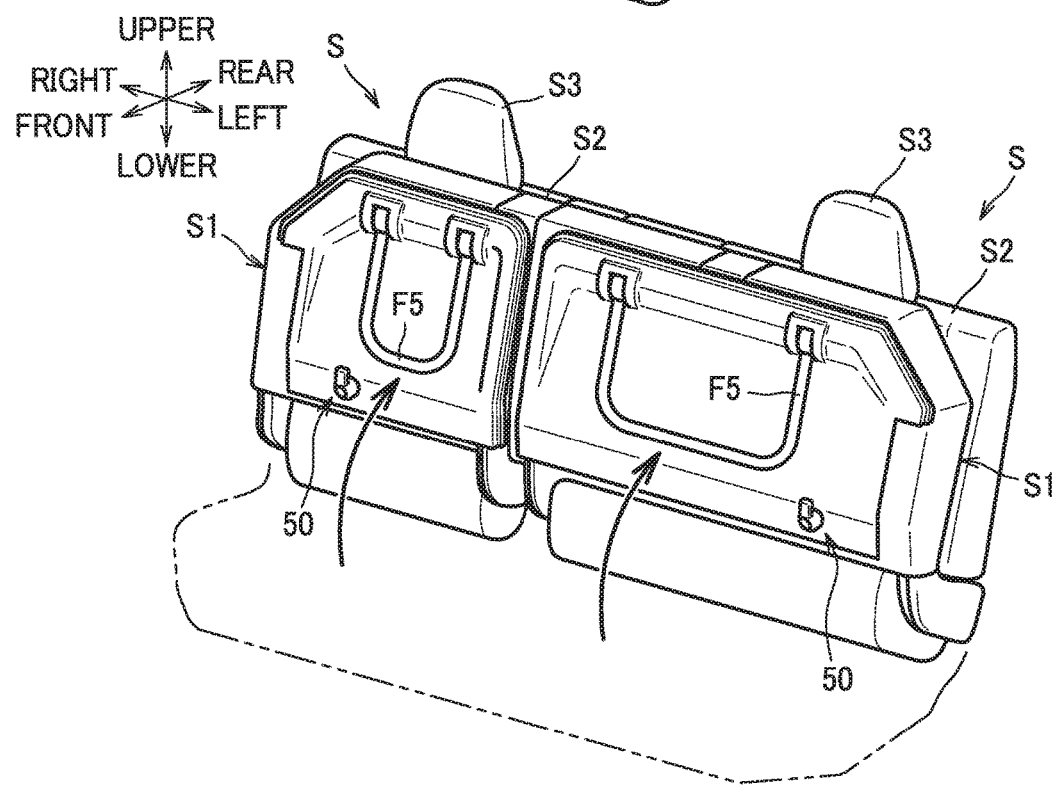
FIG. 1B is a perspective view of the car seat in a tipped-up position.

As seen in FIG. 1, a car seat S as an example of a vehicle seat is a seat used as a rear seat of an automobile, and two car seats S are arranged side by side in a lateral direction to form a bench seat. Each of the car seats S mainly includes a seat cushion S1, a seat back S2, and a headrest S3. The seat cushion S1 is supported so as to be rotatable relative to the seat back S2, and is configured to be movable between a seating position as shown in FIG. 1A for allowing an occupant to be seated thereon and a tipped-up position as shown in FIG. 1B in which position the seat cushion S1 has been tipped up from the seating position. The seat cushion S1 incorporates therein a seat cushion frame F1 shown in FIG. 2 which is an example of a seat frame. A leg member F5 is provided at a lower side of the seat cushion S1. The leg member F5 comes into contact with a floor of the automobile (vehicle) when the seat cushion S1 is in the seating position, so that the seat cushion S1 is supported by the leg member F5. The leg member F5 consists of a pipe bent into a U-shape. The leg member F5 is rotatably supported by the seat cushion S1 (more specifically, by the seat cushion frame F1) and foldable toward the seat cushion S1 in the tipped-up position such as shown in FIG. 1B.

In the following description, directions of the car seat S, such as upper, lower, right and left, are designated as from the viewpoint of an occupant seated on the car seat S when the seat cushion S1 is in the seating position.

A hook member 50 as an example of a baggage holder is provided at a lower surface of the seat cushion S1. The hook member 50 is used for allowing baggage or the like to be hung thereon. The hook member 50 is disposed at a position other than a position of the leg member F5 located when the seat cushion S1 is in the tipped-up position, more specifically, at a position below and laterally outside the leg member F5. Accordingly, the hook member 50 and baggage to be hung on the hook member 50 do not interfere with the leg member F5. The hook member 50 has a distal end which is directed upward when the seat cushion S1 is in the tipped-up position. For this reason, the hook member 50 is suitable for allowing baggage to be hung thereon mainly in the tipped-up position.

The hook member 50 and a mounting structure for mounting the hook member 50 on the seat cushion S1 will be described in detail.

Since two car seats S arranged side by side in the lateral direction are shown in FIG. 1 and the hook member 50 and its mounting structure are similar to each other in these right-side and left-side car seats S, the right-side car seat S of FIG. 1 will be described as a representative in the following description.

Figure 2:
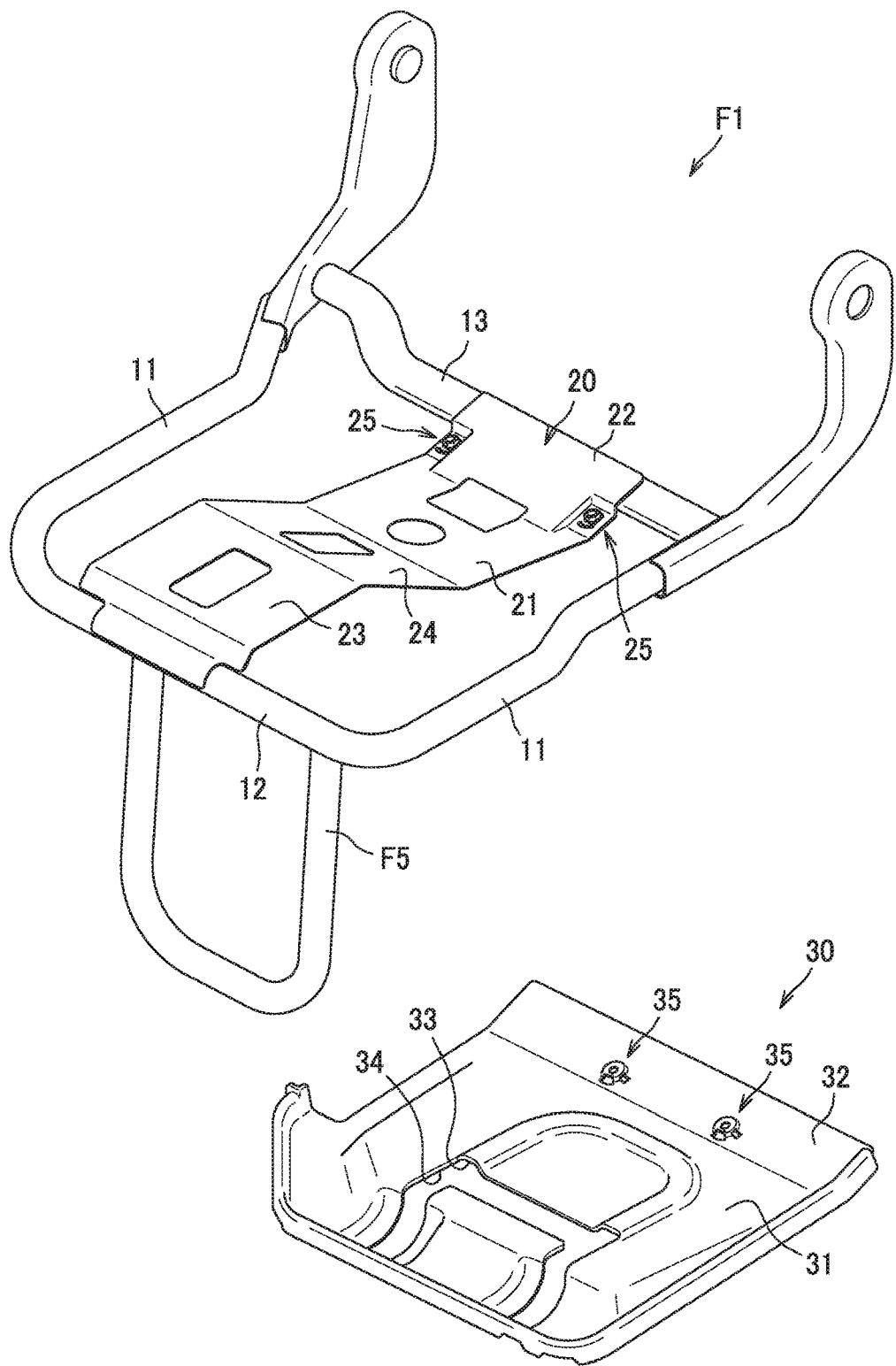
FIG. 2 is a perspective view showing a seat cushion frame and an undercover.

As seen in FIG. 2, the seat cushion frame F1 includes a pair of side frames 11 disposed laterally spaced apart from each other, a front frame 12 connecting front ends of the pair of side frames 11, a rear frame 13 connecting rear ends of the pair of side frames 11, and a pan frame 20 bridging between the front frame 12 and the rear frame 13. All of the side frames 11, the front frame 12, the rear frame 13 and the pan frame 20 are made of metal. An undercover 30 as an example of a cover member is provided under the seat cushion frame F1. The undercover 30 covers the lower side of the seat cushion frame F1.

The pan frame 20 consists of a plate member which includes a rear portion 21 on which buttocks of an occupant are positioned, a rear connecting portion 22 connecting the rear end of the rear portion 21 to the rear frame 13, a front portion 23 extending rearward from the front frame 12 and having a front end fixed to the front frame 12, and a slanted connecting portion 24 connecting the rear end of the front portion 23 and the front end of the rear portion 21 and slanting downward with increasing distance from the front side toward the rear side thereof. Further, fixing portions 25 for fixing the hook member 50 are provided as flat portions; the flat portions are formed on both right and left sides of the rear connecting portion 22 adjacent to the rear portion 21 and at positions one step lower than the rear connecting portion 22. As viewed from the underside (outer side), the fixing portions 25 protrude from the rear portion 21 and the rear connecting portion 22 toward the undercover 30 to form protruding portions. This can provide a higher rigidity to the pan frame 20 (fixing portions 25) as compared with an alternative configuration in which the pan frame is simply shaped like a flat plate.

The undercover 30 includes a main body portion 31 covering substantially the entire seat cushion frame F1 from underside, and a rear fringe portion 32 extending in an obliquely rearward and upward direction from the rear end of the main body portion 31. The main body portion 31 has a U-shaped groove portion 33 corresponding to the shape of the leg member F5 such that when the leg portion F5 is folded up, the groove portion 33 receives the leg portion F5. The groove portion 33 is formed as a recess on the lower surface of the main body portion 31. A through-slot 34 for allowing the leg member F5 to pass therethrough toward the lower surface of the main body portion 31 is provided at a position frontward of and adjacent to the groove portion 33.

The rear fringe portion 32 has two attachment portions 35 provided at positions corresponding to the fixing portions 25 of the pan frame 20. The hook member 50 is attached to the attachment portions 35 from the lower surface of the undercover 30. The undercover 30 is made of plastic.

Figure 3:
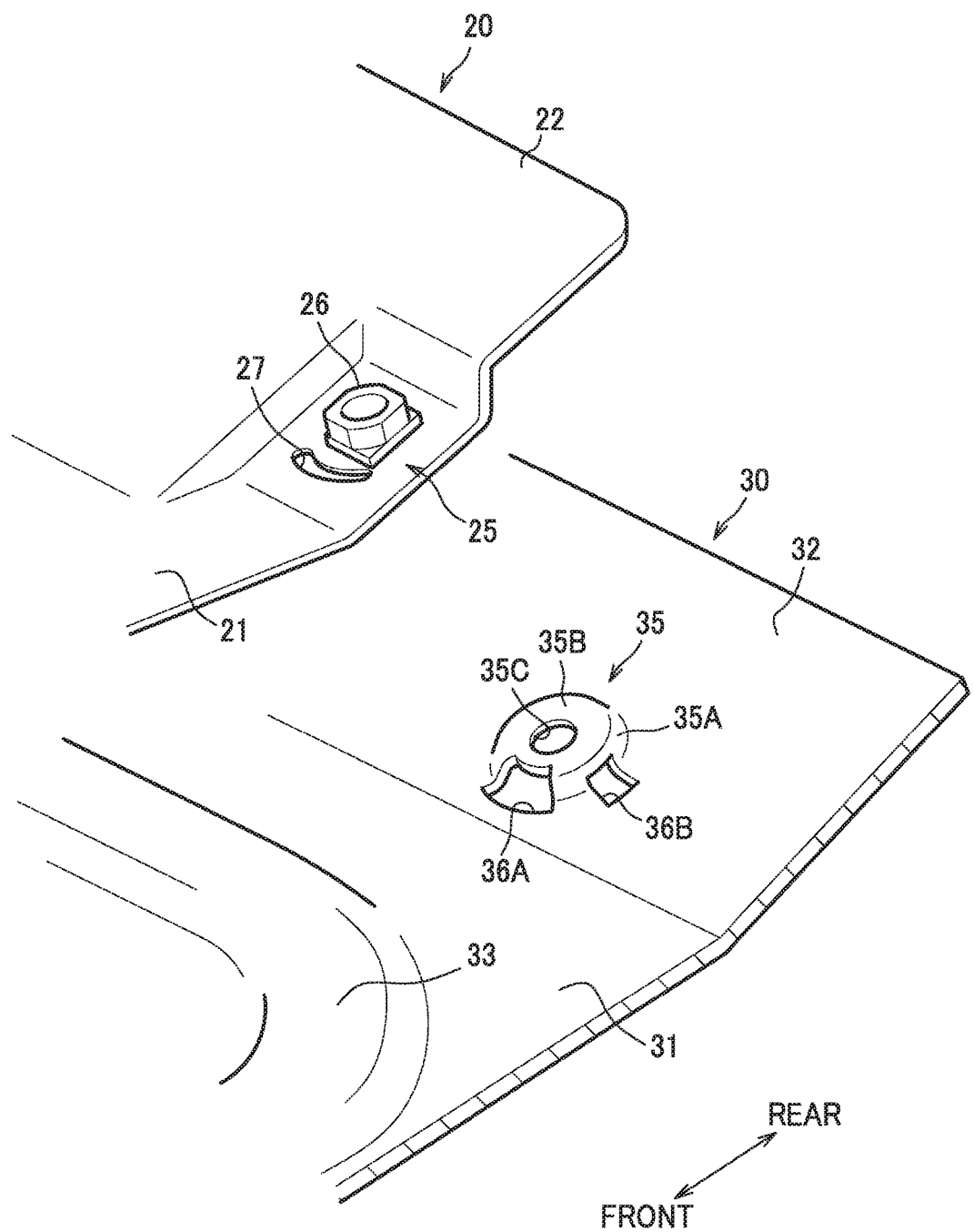
FIG. 3 is a partly enlarged perspective view of FIG. 2.

As seen in FIG. 3, a weld nut 26 is fixed by welding to an upper surface of each of the fixing portions 25 of the pan frame 20. An engagement hole 27 as an example of a first engagement portion is formed in the fixing portion 25 at a position frontward of the weld nut 26. Further, a through-hole 25A is formed in the fixing portion 25 at a position corresponding to the nut-hole of the weld nut 26 (see FIGS. 6 and 7).

The rear fringe portion 32 of the undercover 30 is generally shaped like a plate and has protrusions in the shape of a frustum of a circular cone at the attachment portions 35, each of which protrusions protrudes upward or inward of the car seat S. To be more specific, each attachment portion 35 includes a slanted portion 35A protruding upward from a flat plate portion of the rear fringe portion 32 and tapering to provide a truncated conical surface, and a fastening portion 35B provided at the upper end of the slanted portion 35A to extend parallel to the flat plate portion of the rear fringe portion 32 and having a generally circular shape. The fastening portion 35B has a circular central hole 35C at a position corresponding to the axial center of the weld nut 26.

Figure 4A:
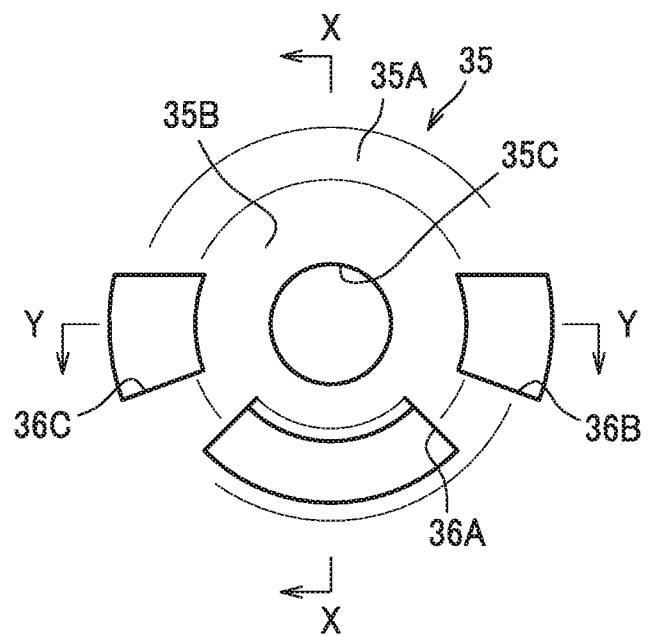
FIG. 4A is a view showing the reverse side of an attaching portion of the undercover.
Figure 4B:
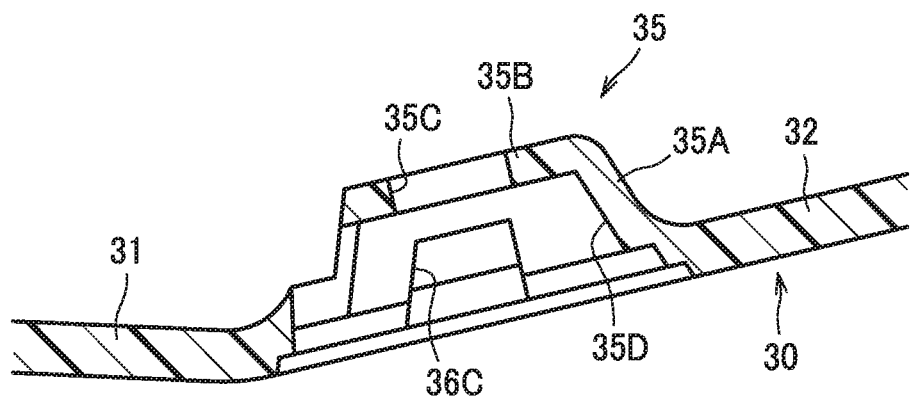
FIG. 4B is a sectional view taken along the line X-X of FIG. 4A.

As seen in FIGS. 4A and 4B, the attachment portion 35 has a first hole 36A as an example of a through-hole, a second hole 36B as an example of a second engagement portion, and a third hole 36C as an example of a third engagement portion, around the central hole 35C. These first, second and third holes 36A, 36B, 36C are arranged on a circle whose center coincides with the center of the central hole 35C, and provided to pierce through the rear fringe portion 32 in the thickness direction of the rear fringe portion 32. As seen in FIG. 4B, the undercover 30 has a recessed portion 35D at the reverse side of each of the frustoconical protrusions, namely on the outer surface of the rear fringe portion 32.

Figure 7:
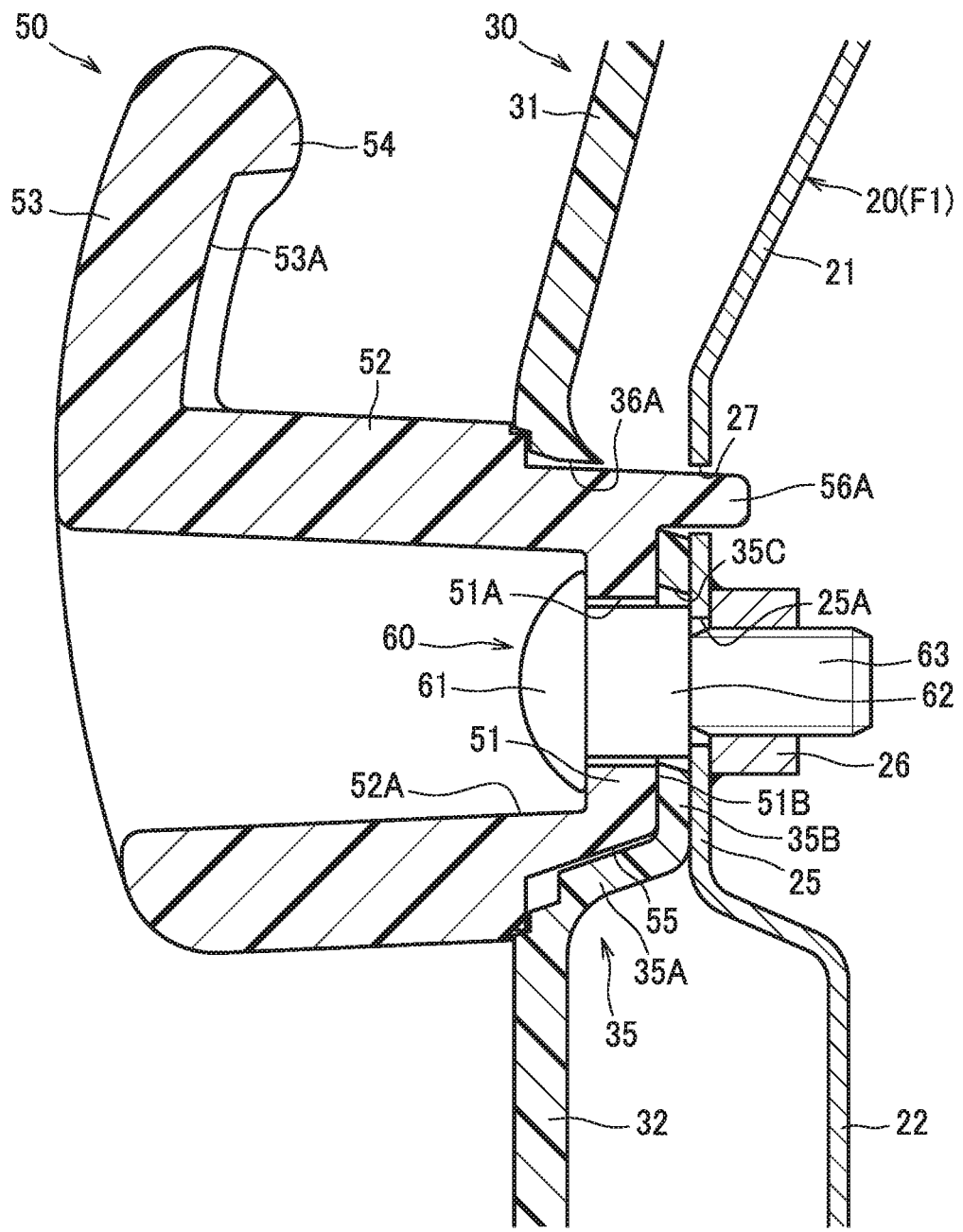
FIG. 7 is a sectional view explaining the hook member attached to the seat cushion frame as viewed from the cross-section taken along the line X-X of FIG. 4A.

As seen in FIG. 7, the hook member 50 includes a fastening portion 51, a first portion 52 extending from the fastening portion 51 in a direction away from the seat cushion S1 (i.e., leftward in the figure) and having a circular cylindrical shape, a second portion 53 extending from the distal end of the first portion 52 along the seat cushion S1, and a third portion 54 protruding from the distal end of the second portion 53 toward the seat cushion S1. A recess 53A is formed on the second portion 53 at a surface facing the undercover 30. Further, as viewed from the underside (outer side), the hook member 50 has a dent portion 52A formed on an inside of the first portion 52.

Figure 5A:
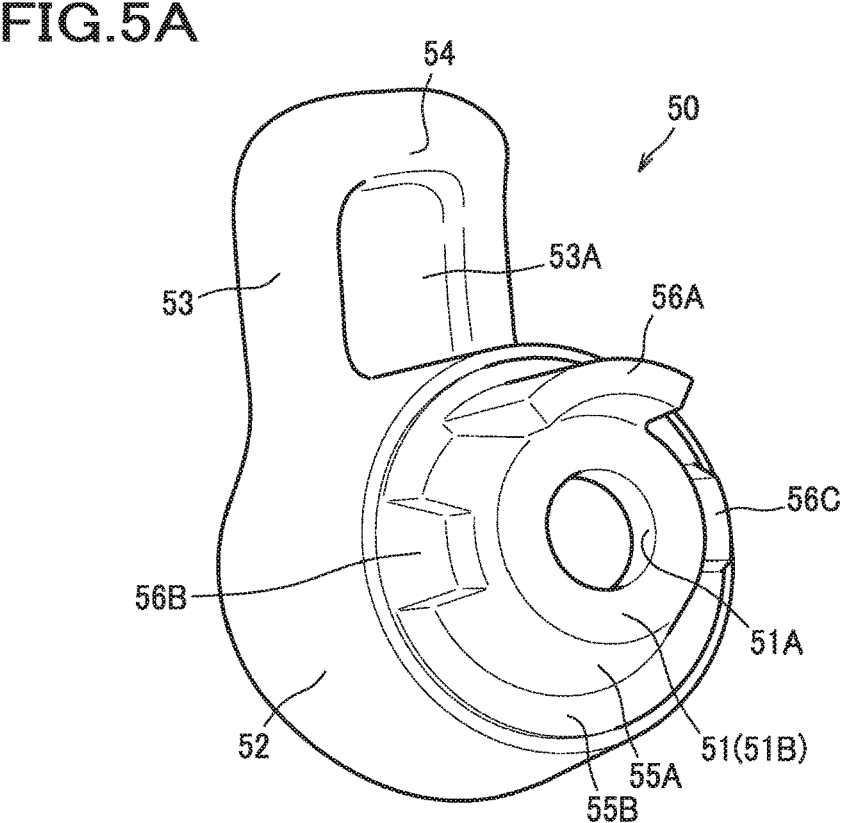
FIG. 5A is a perspective view of a hook member.
Figure 5B:
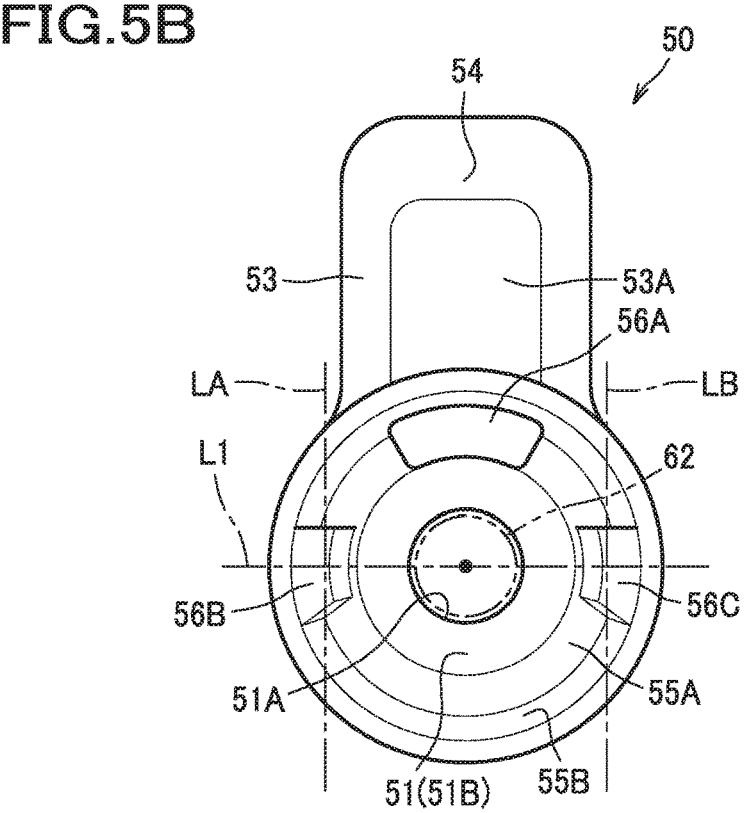
FIG. 5B is a rear view of the hook member.

As seen in FIGS. 5A and 5B, the fastening portion 51 is a circular plate member having a central hole 51A. The fastening portion 51 is fastened and fixed to the seat cushion frame F1 using a bolt 60 as an example of a fastening member to be described later (see FIGS. 6 and 7).

Figure 6:
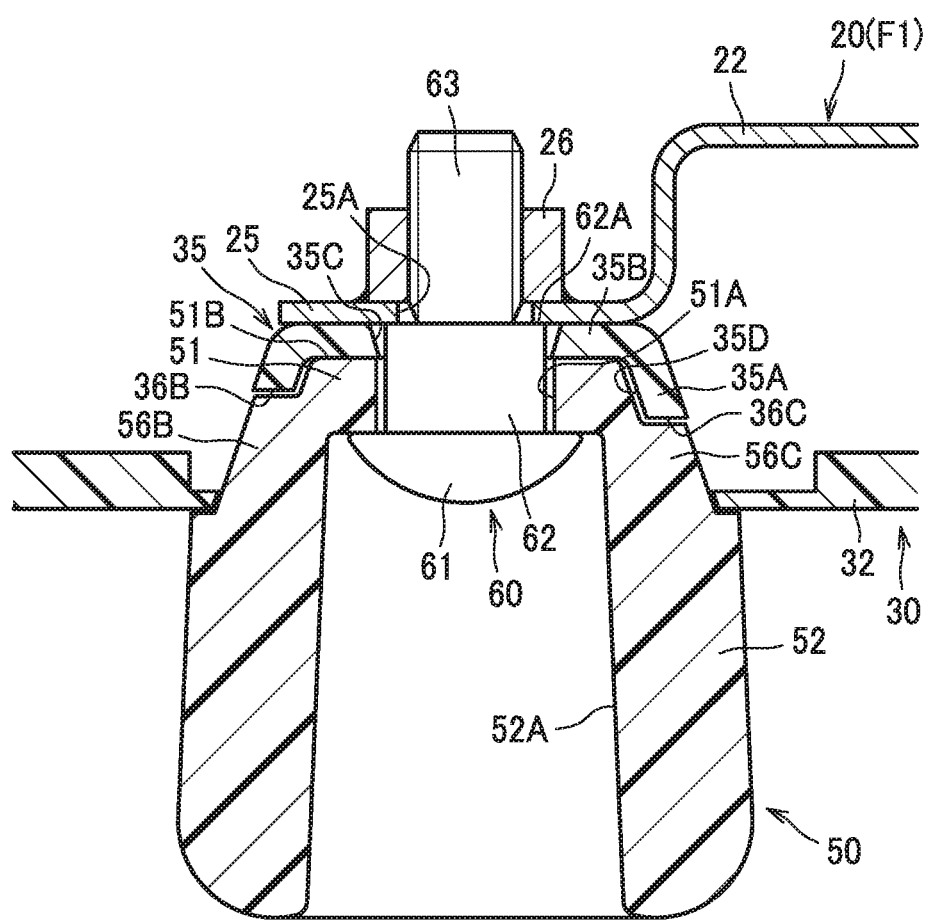
FIG. 6 is a sectional view explaining the hook member attached to the seat cushion frame as viewed from the cross-section taken along the line Y-Y of FIG. 4A.

With reference to FIGS. 6 and 7, the hook member 50 is fixed to the seat cushion frame F1 using a shoulder bolt 60. The shoulder bolt 60 includes a head 61, a circular cylindrical portion 62 as an example of a shank portion, and a thread portion 63. The circular cylindrical portion 62 is disposed to pierce through the central hole 35C of the undercover 30. The length of the circular cylindrical portion 62 is slightly shorter than the total thickness of the fastening portion 35B and the fastening portion 51.

As best seen in FIGS. 5A and 5B, the fastening portion 51 has an inner bearing surface 51B that is a surface located closer to the seat cushion frame F1, and a truncated conical surface 55A extending from the outer periphery of the inner bearing surface 51B toward the first portion 52 and having a shape conforming to the recessed portion 35D of the undercover 30. The diameter of the truncated conical surface 55A increases with increasing distance from the inner bearing surface 51B. An opposing surface 55B is formed at a root of the truncated conical surface 55A so as to extend radially outward from a proximal end of the truncated conical surface 55A that is located closer to the first portion 52. The opposing surface 55B is parallel to the inner bearing surface 51B and faces the undercover 30.

Provided on the opposing surface 55B are a first rotation-restricting portion 56A, a second rotation-restricting portion 56B, and a third rotation-restricting portion 56C, which protrude from the opposing surface 55B toward the seat cushion frame F1. The first, second and third rotation-restricting portions 56A, 56B, 56C are all joined with the truncated conical surface 55A.

As viewed from the axial direction of the shoulder bolt 60, namely from the direction of FIG. 5B, the first rotation-restricting portion 56A is provided around the circular cylindrical portion 62. As best seen in FIG. 7, the first rotation-restricting portion 56A protrudes by the amount sufficient to pass through the first hole 36A of the undercover 30 and to be engageable in the engagement hole 27 of the pan frame 20. The first rotation-restricting portion 56A engages in the first hole 36A so as to contact the edges of the first hole 36A in the circumferential direction and to restrict rotation of the hook member 50.

As seen in FIG. 5B, the second rotation-restricting portion 56B is provided around the circular cylindrical portion 62 as viewed from the axial direction of the shoulder bolt 60. The second rotation-restricting portion 56B protrudes by the amount to be engageable in the second hole 36B of the undercover 30. As best seen in FIG. 6, the second rotation-restricting portion 56B engages in the second hole 36B so as to contact the edges of the second hole 36B in the circumferential direction and to restrict rotation of the hook member 50.

The third rotation-restricting portion 56C is provided around the circular cylindrical portion 62 as viewed from the axial direction of the shoulder bolt 60. The third rotation-restricting portion 56C protrudes by the amount to be engageable in the third hole 36C of the undercover 30. As best seen in FIG. 6, the third rotation-restricting portion 56C engages in the third hole 36C so as to contact the edges of the third hole 36C in the circumferential direction and to restrict rotation of the hook member 50.

Further, as viewed from the axial direction of the shoulder bolt 60, the first rotation-restricting portion 56A is located between the second rotation-restricting portion 56B and the third rotation-restricting portion 56C in a direction passing through the second rotation-restricting portion 56B and the third rotation-restricting portion 56C, namely in a direction in which the straight line L1 extends in FIG. 5B.

In other words, in the section shown in FIG. 5B, the first rotation-restricting portion 56A is located in an area that is defined by a first line LA perpendicular to a direction represented by L1 and passing through the second rotation-restricting portion 56B and a second line LB perpendicular to the direction represented by L1 and passing through the third rotation-restricting portion 56C.

As seen in FIGS. 6 and 7, the undercover 30 is fixed to the seat cushion frame F1 by fastening members (not shown) with the fastening portion 35B of the attachment portion 35 put together with the bottom surface of the fixing portion 25 of the seat cushion frame F1. When the hook member 50 is fixed to the fixing portion 25, the fastening portion 51 of the hook member 50 is inserted into the recessed portion 35D of the undercover 30 from the underside, and then the shoulder bolt 60 is inserted into the weld nut 26 through the central hole 51A of the fastening portion 51, the central hole 35C of the undercover 30 and the through-hole 25A of the pan frame 20 in this order and fixed to the weld nut 26, to thereby fix the hook member 50 to the seat cushion frame F1. In this state, a step surface 62A of the shoulder bolt 60, which is formed between the circular cylindrical portion 62 and the thread portion 63, is brought into contact with the lower surface of the fixing portion 25. Since the length of the circular cylindrical portion 62 is slightly shorter than the total thickness of the fastening portion 35B and the fastening portion 51, the fastening portion 35B of the attachment portion 35 and the fastening portion 51 of the hook member 50 are firmly held between the head 61 of the shoulder bolt 60 and the fixing portion 25, so that the hook member 50 is fixed to the fixing portion 25 and enhanced anchoring of the undercover 30 can be achieved. Further, since the head 61 of the shoulder bolt 60 is received in the dent portion 52A of the hook member 50, a short-length shoulder bolt 60 can be used.

Once the hook member 50 is attached to the seat cushion frame F1, the first rotation-restricting portion 56A engages in the engagement hole 27 of the seat cushion frame F1, the second rotation-restricting portion 56B engages in the second hole 36B of the undercover 30, and the third rotation-restricting portion 56C engages in the third hole 36C of the undercover 30.

In the car seat S configured as described above, the operation of the hook member 50 will be described below.

Figure 8A:
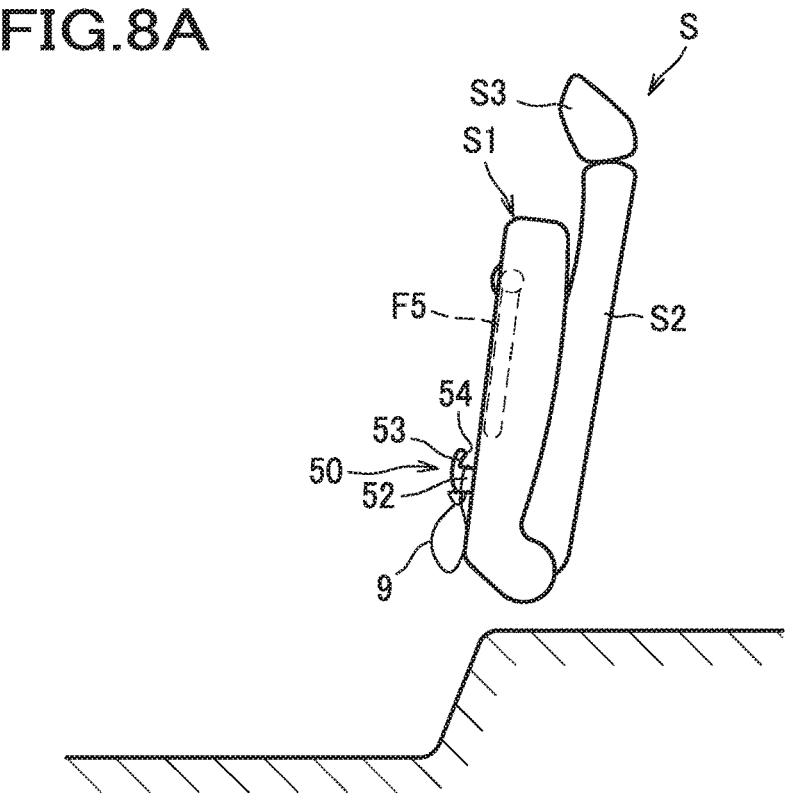
FIG. 8A explains operation and advantages of the hook member when the seat cushion is in the seating position.

As seen in FIG. 8A, when the seat cushion S1 is in the tipped-up position, the second portion 53 of the hook member 50 is oriented to extend upward. This position is suitable for a user to hang baggage 9 on the hook member 50. When the baggage 9 is hung on the hook member 50, it will hang down. However, since the hook member 50 is disposed below the leg member F5 at a position avoiding the leg member F5, the hook member 50 and the baggage 9 are less likely to interfere with the leg member F5.

It should be noted that the hook member 50 is not fixed to the undercover 30 but to the seat cushion frame F1; more specifically, the hook member 50 is fixed to the seat cushion frame F1 using the shoulder bolt 60 with the first rotation-restricting portion 56A being inserted through the undercover 30 from outside to inside and into the engagement hole 27 of the seat cushion frame F1. This can provide high rigidity, and even if the baggage 9 is heavier than usual, the hook member 50 can firmly support the baggage 9.

Further, the first rotation-restricting portion 56A engages in the engagement hole 27, so that the hook member 50 is less likely to be rotated and wobble relative to the seat cushion frame F1. Further, the second rotation-restricting portion 56B engages in the second hole 36B of the undercover 30 and the third rotation-restricting portion 56C engages in the third hole 36C of the undercover 30, so that the hook member 50 is less likely to be rotated relative to the undercover 30. Accordingly, the hook member 50 can firmly support the baggage 9.

Further, a part of the hook member 50 is inserted into the recessed portion 35D of the undercover 30, so that the hook member 50 is stably supported.

Further, the hook member 50 is fixed to the fixing portion 25 of the seat cushion frame F1 that is formed in the protruding portion having a higher rigidity. This can provide high rigidity.

Figure 8B:
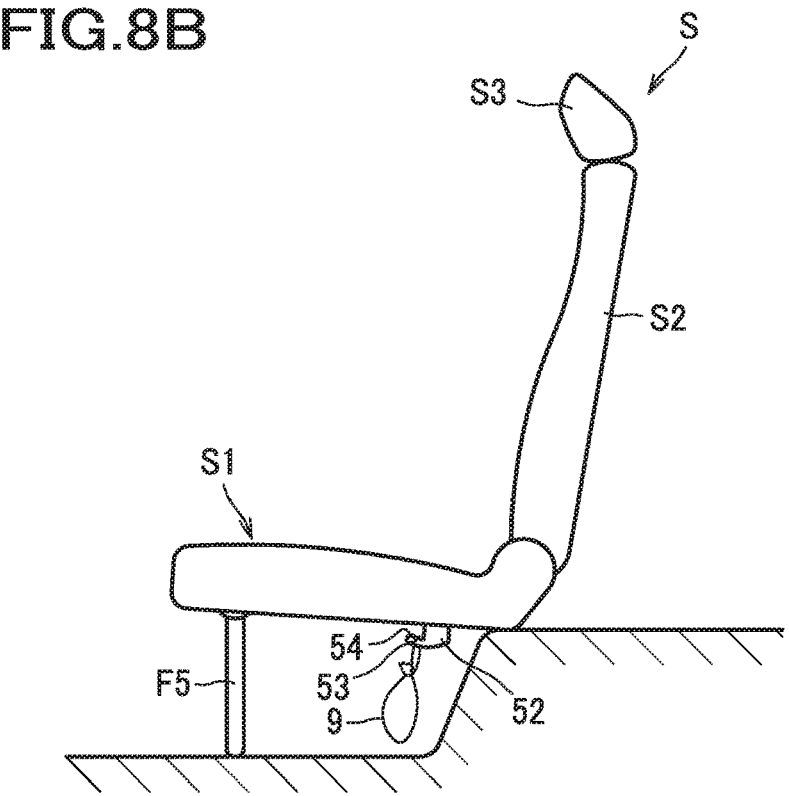
FIG. 8B explains operation and advantages of the hook member when the seat cushion is in the tipped-up position.

Further, the hook member 50 has the third portion 54 protruding from the distal end of the second portion 53 toward the seat cushion S1. Therefore, as best seen in FIG. 8B, even if the seat cushion S1 is pulled down from its tipped-up position into its seating position while the baggage 9 is hung on the hook member 50, the third portion 54 can prevent the baggage 9 from coming off the hook member 50. Further, when the seat cushion S1 is pulled down into the seating position, the leg member F5 rotates frontward such that the distal end (lower end) thereof moves in a direction away from the hook member 50. Therefore, the leg member F5 is less likely to interfere with the hook member 50 and the baggage 9.

According to the car seat S configured as described above, the following advantages can be achieved.

In the car seat S according to the above-described embodiment, the hook member 50 is not fixed to the undercover 30 that is disposed on the lower surface of the car seat S and corresponds to the board of the conventional vehicle seat. Instead, the hook member 50 is passed from outside to inside of the undercover 30 through the central hole 35C and fixed to the seat cushion frame F1, so that the hook member 50 can be firmly fixed to the car seat S.

According to the above-described embodiment, the hook member 50 is fixed to the seat cushion frame F1 by the shoulder bolt 60 that has the circular cylindrical portion 62 (shank portion) piercing through the undercover 30. Further, the hook member 50 includes the first rotation-restricting portion 56A provided around the circular cylindrical portion 62 as viewed from the axial direction of the shoulder bolt 60, and the seat cushion frame F1 includes the engagement hole 27 (first engagement portion) engageable with the first rotation-restricting portion 56A. With this configuration, the first rotation-restricting portion 56A of the hook member 50 engages in the engagement hole 27 of the seat cushion frame F1, so that the hook member 50 is less likely to be rotated relative to the seat cushion frame F1. Accordingly, the hook member 50 is stably supported without wobbling.

Further, the hook member 50 includes the second rotation-restricting portion 56B provided around the circular cylindrical portion 62 as viewed from the axial direction of the shoulder bolt 60, and the undercover 30 includes the second hole 36B (second engagement portion) engageable with the second rotation-restricting portion 56B. With this configuration, the second rotation-restricting portion 56B of the hook member 50 engages in the second hole 36B of the undercover 30, so that the hook member 50 is less likely to be rotated relative to the undercover 30. Accordingly, the hook member 50 is more stable and can be fixed firmly without wobbling.

The hook member 50 further includes the third rotation-restricting portion 56C provided around the circular cylindrical portion 62 as viewed from the axial direction of the shoulder bolt 60, and the undercover 30 includes the third hole 36C (third engagement portion) engageable with the third rotation-restricting portion 56C. Further, as viewed from the axial direction of the shoulder bolt 60, the first rotation-restricting portion 56A is located in an area that is defined by the first line LA and the second line LB. With this configuration, the third rotation-restricting portion 56C of the hook member 50 engages in the third hole 36C of the undercover 30, so that the hook member 50 is much less likely to be rotated relative to the undercover 30. Accordingly, the hook member 50 is more stable and can be fixed firmly without wobbling.

According to the above-described embodiment, the hook member 50 has the dent portion 52A, and a part of the shoulder bolt 60 is received in the dent portion 52A. With this configuration, a short-length shoulder bolt 60 can be used.

Further, the undercover 30 has the recessed portion 35D at the outer surface thereof, and at least a part of the hook member 50 is received in the recessed portion 35D, so that the hook member 50 can be stabilized.

According to the above-described embodiment, the seat cushion frame F1 has the protruding portion configured to protrude toward the undercover 30, and the hook member 50 is fixed to the fixing portion 25 provided in the protruding portion. Since the hook member 50 is fixed to the protruding portion having a higher rigidity, the hook member 50 can be fixed more firmly to the seat cushion frame F1.

According to the above-described embodiment, the hook member 50 is provided on the lower surface of the seat cushion S1, and the seat cushion S1 is configured to be movable between the seating position in which an occupant is allowed to sit on the seat cushion S1 and the tipped-up position in which the seat cushion S1 is tipped up from the seating position. The car seat S further includes the leg member F5 provided on the seat cushion S1 and configured to contact the floor of the automobile to support the seat cushion S1 in the seating position. The leg member F5 is supported rotatably relative to the seat cushion S1 and foldable toward the seat cushion S1 in the tipped-up position. Further, the hook member 50 is disposed at a position other than a position of the leg member F5 located when the seat cushion S1 is in the tipped-up position. With this configuration, baggage 9 or small articles can be easily hung on the hook member 50 while suppressing interference of the hook member 50 with the leg member F5.

Further, according to the above-described embodiment, the hook member 50 includes the first portion 52 extending away from the seat cushion S1, the second portion 53 extending from the distal end of the first portion 52 along the seat cushion S1, and the third portion 54 extending from the distal end of the second portion 53 toward the seat cushion S1. With this configuration, the hook member 50 is in the shape of a hook because of its first portion 52 and second portion 53, and the third portion 53 extending toward the seat frame 51 is provided at the distal end of the hook. This can prevent the baggage 9 or the small articles hung on the hook member 50 from coming off the hook member 50 even if the seat cushion S1 is in the seating position.

Although one embodiment of the present invention has been described above, the present invention is not limited to the above-described embodiment. It is to be understood that various modifications and changes may be made to any of the specific configurations where necessary without departing from the scope of the present invention.

In the above-described embodiment, the hook member 50 configured to allow baggage 9 to be hung thereon is used as an example of a baggage holder. However, the present invention is not limited to this specific configuration. For example, the baggage holder may be a ring-shaped member configured to allow baggage to be hooked thereon, and a hook-shaped member such as a handle of an umbrella may be hooked on the ring-shaped baggage holder. As an alternative, the baggage holder may be rope-like members for tying up baggage.

In the above-described embodiment, the shoulder bolt 60 is used as the fastening member. However, the present invention is not limited to this specific configuration. For example, the fastening member may be a bolt without a shoulder or a rivet. Further, the shank portion is not limited to the circular cylindrical portion 62 of the shoulder bolt 60, and may be a threaded shank portion.

Further, in the above-described embodiment, the present invention is applied to a seat used in an automobile (i.e., car seat S). However, the present invention is not limited thereto, and applicable to any other seat used in other vehicles, such as rail cars, ships and aircraft.

What is claimed is:

1. A vehicle seat comprising:
    a seat frame;
    a cover member configured to cover the seat frame and having a through-hole; and
    a baggage holder configured to allow baggage to be hung, hooked or fixed thereon,
    wherein the baggage holder is passed from outside to inside of the cover member through the through-hole and fixed to the seat frame,
    wherein the baggage holder is fixed to the seat frame by a fastening member that has a shank portion piercing through the cover member,
    wherein the baggage holder has a dent portion, and a part of the fastening member is received in the dent portion.

2. The vehicle seat according to claim 1, wherein the baggage holder comprises a first rotation-restricting portion provided around the shank portion as viewed from an axial direction of the fastening member, and
    wherein the seat frame comprises a first engagement portion engageable with the first rotation-restricting portion.

3. The vehicle seat according to claim 2, wherein the baggage holder comprises a second rotation-restricting portion provided around the shank portion as viewed from the axial direction of the fastening member, and
    wherein the cover member comprises a second engagement portion engageable with the second rotation-restricting portion.

4. The vehicle seat according to claim 3, wherein the baggage holder comprises a third rotation-restricting portion provided around the shank portion as viewed from the axial direction of the fastening member,
    wherein the cover member comprises a third engagement portion engageable with the third rotation-restricting portion, and
    wherein as viewed from the axial direction of the fastening member, the first rotation-restricting portion is located in an area that is defined by a first line perpendicular to a first direction connecting the second rotation-restricting portion and the third rotation-restricting portion and passing through the second rotation-restricting portion and a second line perpendicular to the first direction and passing through the third rotation-restricting portion.

5. The vehicle seat according to claim 1, wherein the cover member has a recessed portion at an outer surface thereof, and
    wherein a part of the baggage holder is received in the recessed portion.

6. The vehicle seat according to claim 1, wherein the seat frame has a protruding portion configured to protrude toward the cover member, and
    wherein the baggage holder is fixed to the protruding portion.

7. The vehicle seat according to claim 1, wherein the baggage holder is provided on a lower surface of a seat cushion,
    wherein the seat cushion is configured to be movable between a seating position in which an occupant is allowed to sit on the seat cushion and a tipped-up position in which the seat cushion is tipped up from the seating position,
    wherein the vehicle seat further comprises a leg member provided on the seat cushion and configured to contact a floor of a vehicle to support the seat cushion in the seating position, the leg member being supported rotatably relative to the seat cushion and foldable toward the seat cushion in the tipped-up position, and
    wherein the baggage holder is disposed at a position other than a position of the leg member located when the seat cushion is in the tipped-up position.

8. The vehicle seat according to claim 7, wherein the baggage holder comprises a first portion extending away from the seat cushion, a second portion extending from a distal end portion of the first portion along the seat cushion, and a third portion extending from a distal end portion of the second portion toward the seat cushion.

9. A vehicle seat comprising:
    a seat frame;
    a cover member configured to cover the seat frame and having a through-hole; and
    a baggage holder configured to allow baggage to be hung, hooked or fixed thereon,
    wherein the seat frame has a fixing portion configured to protrude toward the cover member, wherein the baggage holder is passed from outside to inside of the cover member through the through-hole and fixed to the fixing portion, and where in the cover member has a contacting surface at which the cover member is in contact with the fixing portion.

10. The vehicle seat according to claim 9, wherein the cover member has a recessed portion at an outer surface thereof, and wherein a part of the baggage holder is received in the recessed portion.

11. The vehicle seat according to claim 9, wherein the seat frame comprises a front frame, a rear frame, and a pan frame bridging between the front frame and the rear frame, and wherein the fixing portion is provided on the pan frame.

12. The vehicle seat according to claim 9, wherein the seat frame has a first surface facing to the cover member, and a second surface opposite to the first surface, wherein the fixing portion has a storage recess portion on the second surface, and wherein the baggage holder is fixed to the fixing portion by bolt and nut, and the nut is located in the storage recess portion.

13. The vehicle seat according to claim 9, wherein a part of the cover member is held between the fixing portion and the baggage holder.

14. The vehicle seat according to claim 11, wherein two fixing portions are provided at right and left sides of the pan frame, and wherein the right and left fixing portions are arranged along the rear frame.

15. The vehicle seat according to claim 14, wherein the pan frame has a central portion between the right and left fixing portions, the central portion protruding away from the cover member.

16. The vehicle seat according to claim 9, wherein two fixing portions are provided at right and left sides of the seat frame, and wherein the seat frame has a central portion between the right and left fixing portions, the central portion protruding away from the cover member.

17. A vehicle seat comprising:

a seat frame;

a cover member configured to cover the seat frame and having a through-hole; and a baggage holder configured to allow baggage to be hung, hooked or fixed thereon, wherein the baggage holder is passed from outside to inside of the cover member through the through-hole and fixed to the seat frame, wherein the baggage holder is provided on a lower surface of a seat cushion, wherein the seat cushion is configured to be movable between a seating position in which an occupant is allowed to sit on the seat cushion and a tipped-up position in which the seat cushion is tipped up from the seating position, wherein the vehicle seat further comprises a leg member provided on the seat cushion and configured to contact a floor of a vehicle to support the seat cushion in the seating position, the leg member being supported rotatably relative to the seat cushion and foldable toward the seat cushion in the tipped-up position, and wherein the baggage holder is disposed at a position lower than a position of the leg member located when the seat cushion is in the tipped-up position.

18. The vehicle seat according to claim 17, wherein the baggage holder comprises a first portion extending away from the seat cushion, a second portion extending from a distal end portion of the first portion along the seat cushion, and a third portion extending from a distal end portion of the second portion toward the seat cushion.

* * * * *